(12) United States Patent
Stevens

(10) Patent No.: US 8,159,345 B2
(45) Date of Patent: Apr. 17, 2012

(54) RFID MONITORING AND TRACKING OF TOOLS

(75) Inventor: John K. Stevens, Stratham, NH (US)

(73) Assignee: Visible Assets, Inc., Mississauga, Ontario (CA)

( * ) Notice: Subject to any disclaimer, the term of this patent is extended or adjusted under 35 U.S.C. 154(b) by 426 days.

(21) Appl. No.: 12/429,835

(22) Filed: Apr. 24, 2009

(65) Prior Publication Data

US 2009/0267769 A1    Oct. 29, 2009

Related U.S. Application Data

(60) Provisional application No. 61/048,086, filed on Apr. 25, 2008.

(51) Int. Cl.
*G08B 21/00* (2006.01)
(52) U.S. Cl. .......... 340/568.1; 340/572.1; 206/373
(58) Field of Classification Search ............... 340/572.1, 340/568.1, 539.1; 206/372, 373; 705/22
See application file for complete search history.

(56) References Cited

U.S. PATENT DOCUMENTS

| | | | |
|---|---|---|---|
| 6,989,749 B2 * | 1/2006 | Mohr | 340/572.1 |
| 7,564,353 B2 * | 7/2009 | Stevens et al. | 340/572.1 |
| 7,755,482 B2 * | 7/2010 | Hubbard | 340/568.1 |
| 2003/0102970 A1 * | 6/2003 | Creel et al. | 340/568.1 |

* cited by examiner

*Primary Examiner* — Jeffery Hofsass
(74) *Attorney, Agent, or Firm* — Larson & Anderson, LLC

(57) ABSTRACT

A system for identifying, monitoring, and tracking a plurality of tools includes: a pad for placing the tools, wherein the pad includes a plurality of appropriately-sized cutouts for nesting each of the tools; a sensor in each cutout that detects placement and removal of the tool in the cutout; and a low frequency radio tag placed in the pad and operatively coupled with each sensor for reading each sensor. The low frequency radio tag operates at a low clock frequency and is configured to receive and transmit data signals within a peer-to-peer network with any low frequency radiating transceiver. The low frequency radio tag includes: a tag antenna operable at a low radio frequency not exceeding 450 kilohertz, a transceiver, a data storage device for storing data for identifying the tools, a processor for processing the data; and a connector for a power source.

27 Claims, 12 Drawing Sheets

Option 2 RuBee Smart Pad -- Level 1 Security + Mobile Logging

Tag embedded in foam with extra SRAM optional display buttons and LED - can read individual sensors, but also data logs tool removal and placement and provides local information about status and history. Records are maintained without a RuBee Reader and requires no external plugs connectors or power. Battery Life 10 years.

Level 1 Security

Cutout tool sensor

Prior art, sensors placed in cutouts to detect presence of tool. Sensors connected to a wiring harness to read presence.

Figure 2

Option 1 -- Level 1 Security

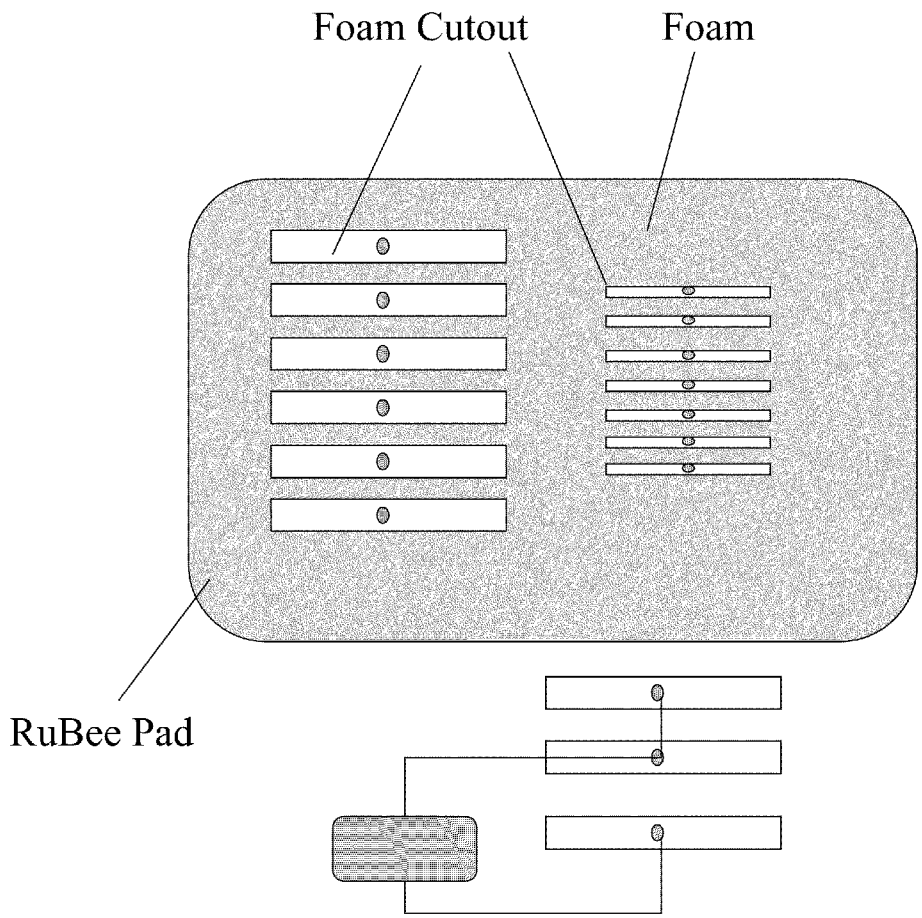

Option 1 – Presence detection. RuBee tag (s) connected to individual sensors, or sets of sensors and readable inside steel case. Tag detects tools presence or absence in foam cutout. Tag maybe read remotely (10'-20' to carry out full physical inventory of tool presence in foam. This also provides mobile presence detection at the worksite without power wiring harness.

Option 1 RuBee Pad -- Level 1 Security

Tag embedded In foam and connected to individual sensors. Requires no external plugs connectors or power. Battery Life 10 years.

Figure 4

Option 2 RuBee Smart Pad -- Level 1 Security + Mobile Logging

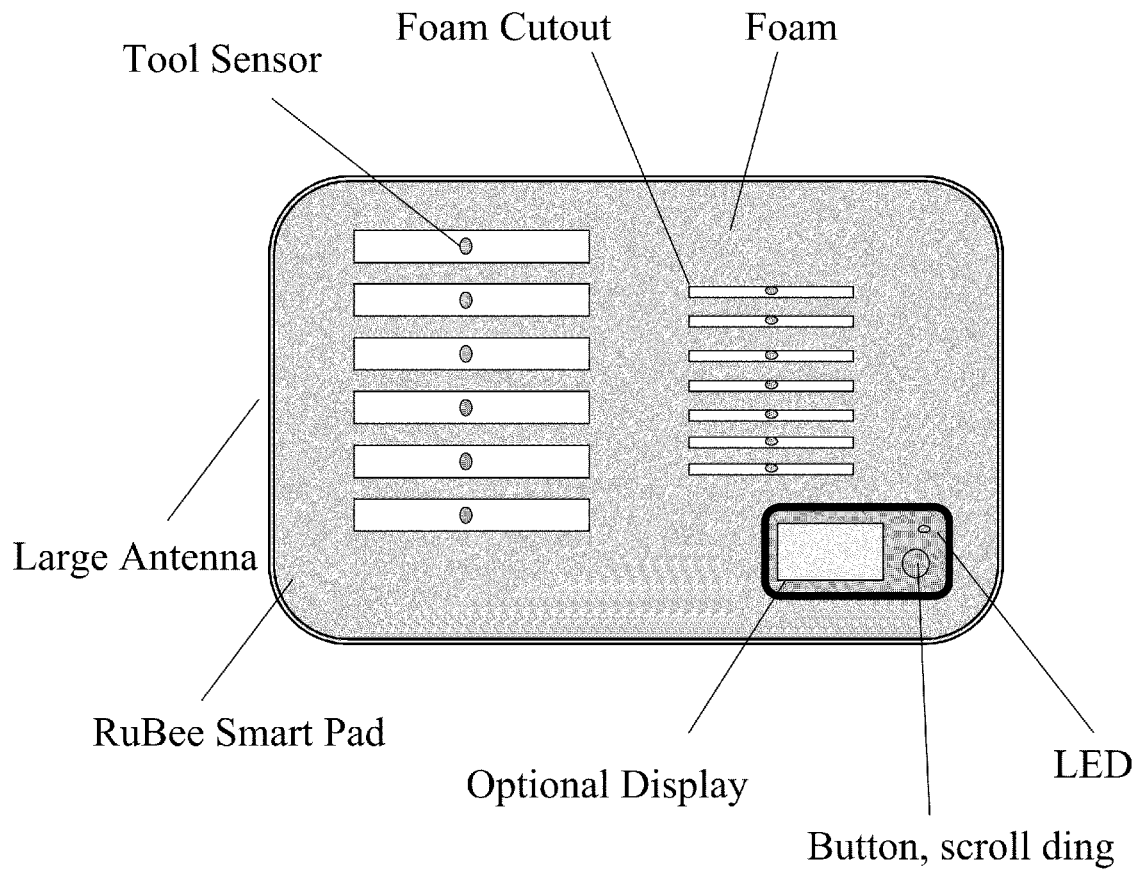

Tag embedded in foam with extra SRAM optional display buttons and LED - can read individual sensors, but also data logs tool removal and placement and provides local information about status and history. Records are maintained without a RuBee Reader and requires no external plugs connectors or power. Battery Life 10 years.

Option 3 RuBee Tool -- Level 1,2 Security, tag applied to tool

Option 3: RuBee Tag (iDot or toll-Tag) attached to the built tool. Tool itself maybe read and identified in steel case or in work area. Authentication not possible.

This option prevents spoofing and cloneablity of any tool, and enables full authentication.

Option 4 RuBee Smart Tool -- Level 1,2,3,4 Security, Smart Tool

Option 4: RuBee Tag built into tool. Tool itself maybe read and identified in steel case or in work area.

This option prevents spoofing and cloneablity of any tool, and enables full authentication.

RuBee Reader

Full physical inventory as moving by an antenna from RuBee Pad, and can harvest full data logs from a RuBee Smart Pad, and can identify and RuBee enabled tools RuBee Reader We can read ID of person using tools as move by an area RuBee Reader Full physical inventory in tool box with drawers, can read, RuBee Pads, RuBee Smart Pads, RuBee Tools.

ID and lock control of tool box user

Option 4 has advantage that lost tools maybe seen missing but also found with wireless RuBee finder Option 4 also has advantage that tool authentication – means a clone or spoof tool can not be used to replace a lost tool in tool box. Option 3 does not provide either.

Option 1 and 2 and will work seamlessly with existing RuBee installations and can provide logs and checks or entry exists, ID and tool location history, using active RuBee Mats and other antennas already installed.

RFID MONITORING AND TRACKING OF TOOLS

CROSS-REFERENCE TO RELATED APPLICATIONS

This application is a non-provisional of, and claims priority from U.S. Patent Application Ser. No. 61/048,086, filed on Apr. 25, 2008. This application is a continuation-in-part of, and claims priority from, U.S. Patent Application Ser. No. 61/030,863, filed on Feb. 22, 2008, and U.S. Patent Application Ser. No. 61/031,663, filed on Feb. 26, 2008, both of which applications claim priority from U.S. Patent Application Ser. No. 60/913,656, filed on Apr. 24, 2007, which in turns claims priority from U.S. patent application Ser. No. 11/633,751, filed on Dec. 4, 2006. The above-mentioned applications are incorporated herein by reference in their entireties.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The invention disclosed broadly relates to the field of visibility and more particularly relates to the field of wireless visibility networks.

BACKGROUND OF THE INVENTION

Industries such as airlines and medical industries spend huge sums of money on their "tools" and require constant inventorying and monitoring of their tools. These tools may be machine parts, medical devices and equipment, and other supplies. Tool theft is a vexing problem. Likewise, the requirement to keep up with recalls of tools and machine parts can also become a daunting task, especially where tools are carried from site to site. Tool loss not only causes an inventory loss, it can cause immeasurable damage. Consider the case where an aircraft maintenance tool is lost in an engine.

There is a need for a system and method to adequately identify and monitor tools.

SUMMARY OF THE INVENTION

Briefly, in an embodiment of the present invention, we describe a system for identifying, monitoring and tracking a plurality of tools, including: a pad for placing the tools, wherein the pad includes a plurality of appropriately-sized cutouts for nesting each of the tools; a sensor in each cutout that detects placement and removal of the tool in the cutout; and a low frequency radio tag placed in the pad and operatively coupled with each sensor for reading each sensor.

The low frequency radio tag operates at a low clock frequency and is configured to receive and transmit data signals within a peer-to-peer network with any low frequency radiating transceiver. The low frequency radio tag includes: a tag antenna operable at a low radio frequency not exceeding 450 kilohertz, a transceiver, a data storage device for storing data for identifying the tools, a processor for processing the data; and a connector for a power source.

Briefly, in another embodiment of the present invention, a method for identifying, monitoring, and tracking tools includes steps or acts of: placing a sensor in each cutout of a pad for housing the tools, wherein each tool is nested in an appropriately sized cutout, wherein the sensor detects placement and removal of the tool; placing a low frequency radio tag in the pad; and operatively coupling the radio tag with each sensor.

BRIEF DESCRIPTION OF THE DRAWINGS

To describe the foregoing and other exemplary purposes, aspects, and advantages, we use the following detailed description of an exemplary embodiment of the invention with reference to the drawings, in which:

FIG. 2 shows a RuBee Pad;
FIG. 4 shows a RuBee Smart Pad.

Figure 1:
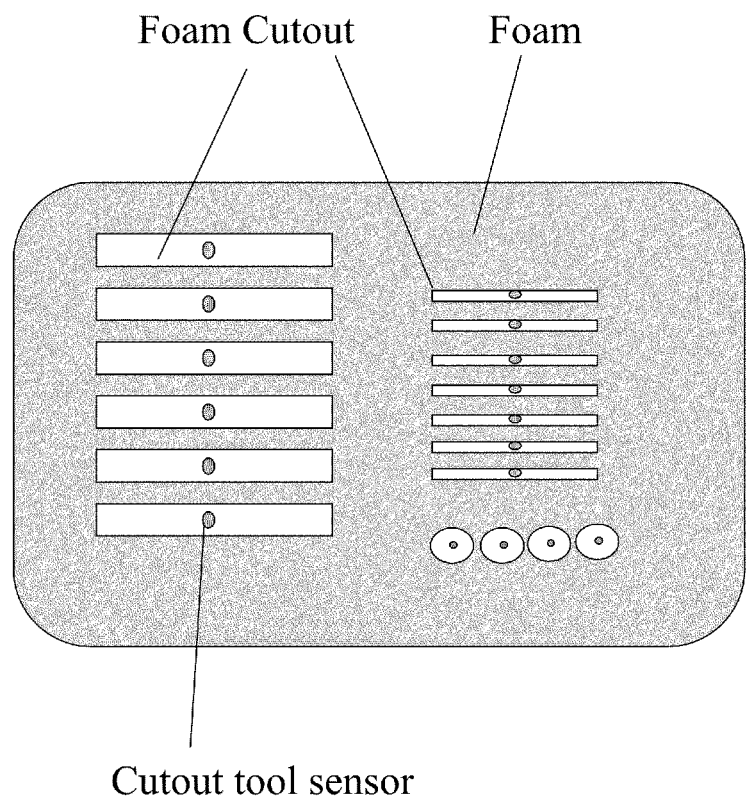
FIG. 1 shows a conventional presence detection cut-out pad.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

In this application, we disclose a novel version of the active LF transceiver as opposed to RFID (Transponder) that is combined with either a pad with cutouts and sensors, or with a tool directly. The pad may be a foam board (commonly known as "tool drawer foam") with cutouts in the shape of the tools to be nested in the cutouts. The foam may be closed-cell polyethylene or ESD foam electrostatic dissipative (conductive) that controls static electricity. The foam may be laminated. A tool as discussed herein is not limited to tools such as those found in a toolbox. We use the term "tool" to represent objects with a specific utility, such as construction tools (hammers, wrenches), medical implements (IV bags, leads), and so on.

Throughout this disclosure we reference the four security levels as used with existing tool tracking systems:

Level 1—Presence detection—detection through some means if the tool is in the proper storage location.

Level 2—Tool Identity—detect through some means if the tool is in proper storage location and identify the tool.

Level 3—Tool Authentication—detect through some means if the tool is in proper storage location and identify the tool, and authenticate that the correct tool is in the correct storage location.

Level 4—Lost and Found Visibility—detect through some means if the tool is in proper storage location and identify the tool, and authenticate that the exact same tool is in the correct storage location, and locate the tool if it is lost inside an engine.

The radio tag can function in a full peer-to-peer network with any LF active radiating transceiver as well as with large area loop antennas placed around a room, door or shelf or tool cabinet. This enables area read or "touchless" communication to and from a tool storage area on a shelf or near a work area without any contact or process control change by personnel. In addition, a similar tag may be worn or carried in a wallet by the tool user so the identity of the tool user may be logged. The same user ID tag may be used to lock and unlock a tool cabinet by having the user simply walk up to the tool cabinet.

Another unique aspect of the invention is that the design of a low frequency active radio tag is not affected by "harsh environmental" factors commonly found in areas where tools are used. In a medical setting, water or fluids associated with a patient or drug delivery system block UHF radio signals.

Another unique aspect of the invention is the fact that the low frequency tag and its circuitry require minimal power since they operate at low clock frequencies. That makes it possible to use a small lithium (Li) coin battery to operate the chip(s) for many years when the tag may be in storage with no net loss of effective life.

Another unique aspect of the invention is the addition of an LCD (liquid crystal display) and LEDs (light-emitting diodes). These may be used for a variety of different functions such as pick and put functions, date temperature maximums, current temperature, tool identification, history and use, automated recall if required, display of status. These may be manufactured using methods described in a previous disclosure (60/712,730) for embedding and sealing LCDs and LEDs and batteries at low temperatures.

Another unique aspect of the invention is that a full integrated system with all four levels of security described above may be purchased over time. All systems are forward and backward compatible.

Figure 3:
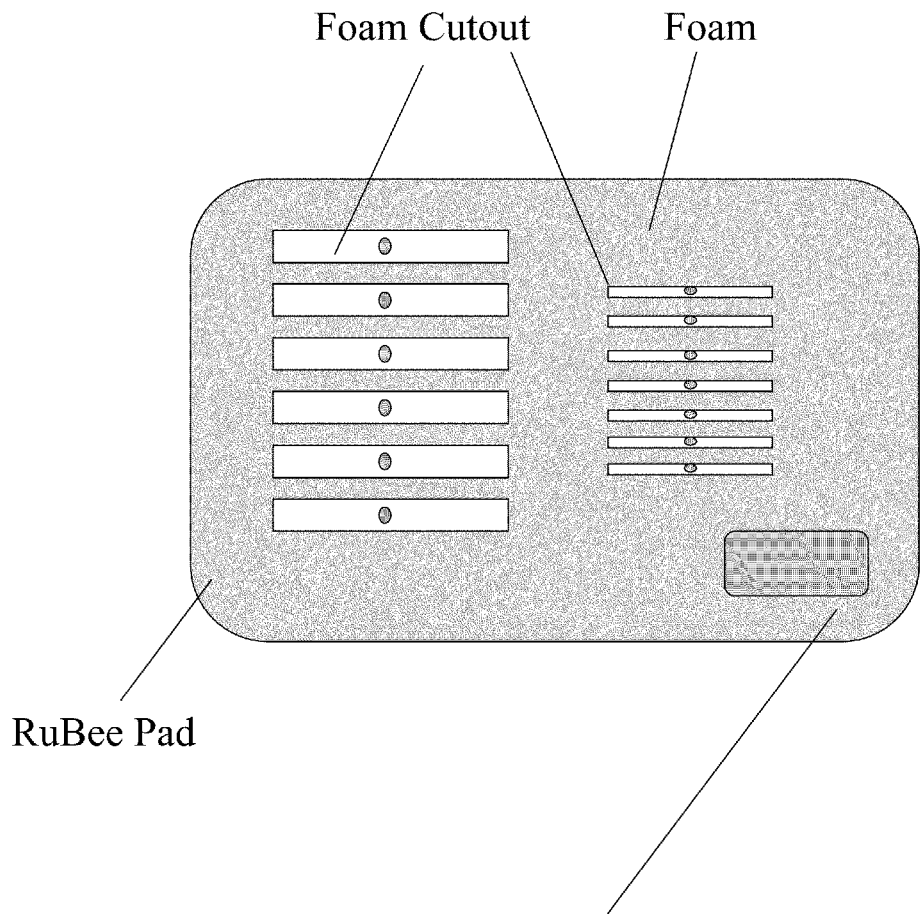
FIG. 3 shows another embodiment of the RuBee pad.

RuBee Pad: The initial system may include a RuBee Pad with cutouts and sensors (as shown in FIGS. 2, 3, and 4) and use standard tools. The RuBee Pad is mobile and can be placed in a bag or carried to the point of work. The RuBee Pad can simply be interrogated by any RuBee-based reader or handheld to determine presence or absence of tools in the cutout. This can be carried out in a tool box or at the remote site.

RuBee Smart Pad: This is the same basic embodiment as the RuBee Pad, but uses a larger antenna that provides an open range of 40-50 feet. The tag has optional display buttons and LEDs so it can serve as a standalone Tool Monitor and can read ID tags. The Smart Pad is capable of maintaining data logs of dates and times tools (temporal history) are removed, or replaced with User ID and does not require a RuBee Reader. A RuBee Reader can harvest the log, and can also use the Smart pad as a standard RuBee Pad. The expected battery life on a standard CR2525 Li battery is 10 years. The RuBee Smart Pad can provide Level 1 security.

RuBee Tools: A tool that has either an iDot (passive RuBee Tag) or conventional RuBee tag attached to the outside of the tool. This does provide ID, and can provide lost and found visibility, but without authentication.

RuBee Smart Tool: In this embodiment, the tag is manufactured into the tool (embedded). This embodiment provides levels 1, 2, 3, and 4 security. The built in tags cannot be removed, and because the tag has a date and time clock full public private key authentication is supported to prove that the tool replaced is the original tool. Tools cannot be spoofed or cloned.

FIG. 1 shows a conventional presence detection cut-out pad. May have sensors or barcode readers in each cutout, with wiring harness, and ID detection.

FIG. 2, RuBee Option 1, a RuBee Pad, has sensors in each cutout that detect the tool. The RuBee tag is connected to a sensor via an embedded wire, and reports to a base station that the tool is present or not.

Referring to FIG. 3, the RuBee pad will look like any other pad with tool cutouts, however it is wireless and mobile. The pad may be removed from a drawer and taken to a remote work site. The battery life on the system is a proven ten years on a Li CR2525, and read range will be 12 to 15 feet. The RuBee Pad can detect the presence of any tool labeled or unlabelled.

In FIG. 4 we show the same pad as described above, however the antenna is placed around an outside area of the pad. This increases range to about 40-50 feet. The tag has an optional display and button, LED with extra SRAM for data logging.

Figure 5:
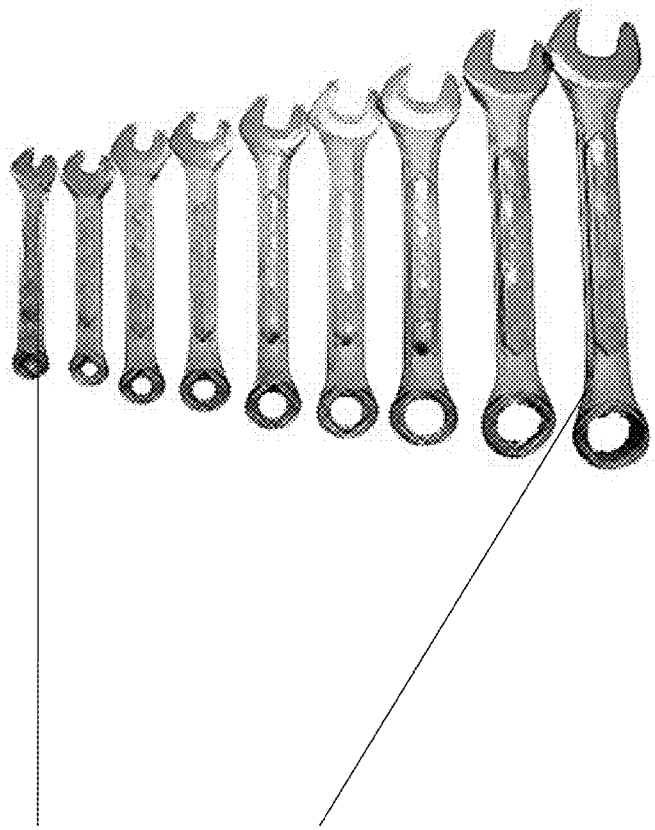
FIG. 5 shows RuBee Tools.
Figure 6:
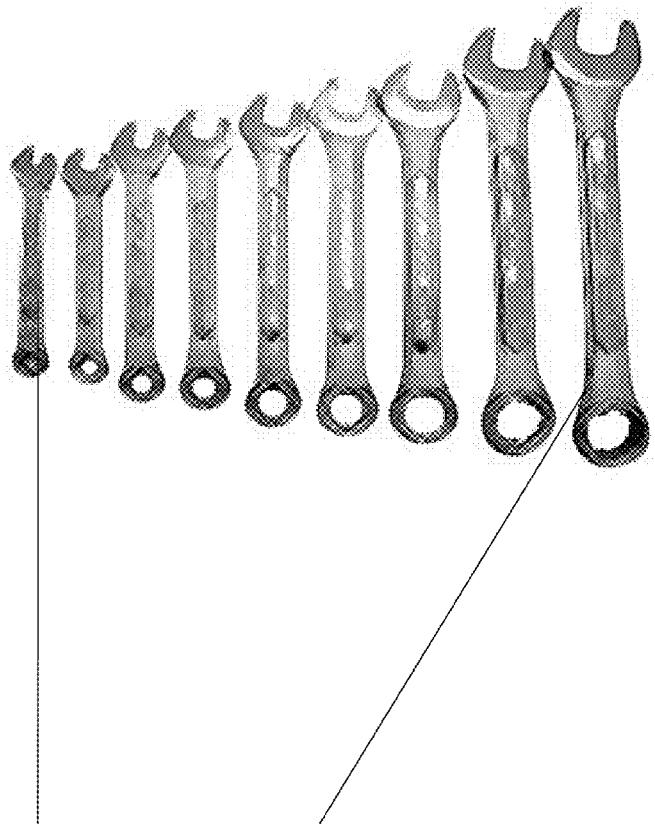
FIG. 6 shows the tag embedded within a tool.

In FIG. 5 we show an optional placement of tags placed on tools with adhesive. Both active and passive RuBee tags can be used for this embodiment. In another embodiment, as shown in FIG. 6, the tag is manufactured as part of the tool. This is capable of data logging drops, or abuse, as well as things like temperature and torque, and last calibration.

Figure 7:
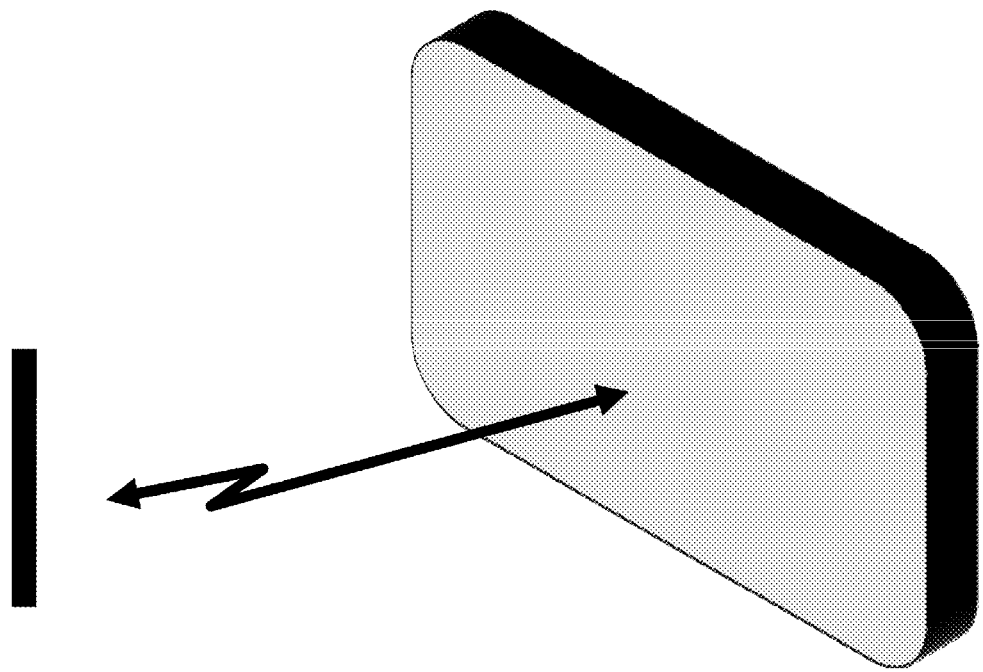
FIG. 7 shows a RuBee Pad at a worksite.
Figure 8:
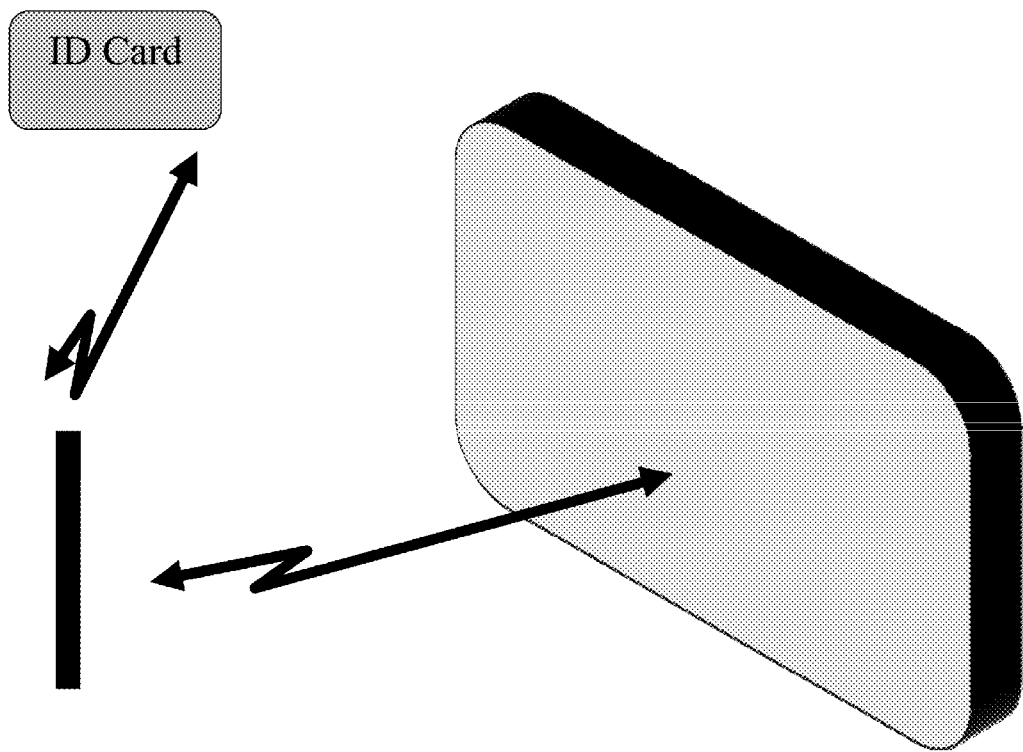
FIG. 8 shows an ID card that is RuBee enabled.

FIG. 7 shows a RuBee Pad or Smart Pad. It may be removed from storage and taken to a work site. A full inventory can be obtained as it passes by a reader, or a reader can be placed at the worksite. FIG. 8 shows the Smart Pad in communication with an ID card that is RuBee-enabled, so the reader can link the use of the tools and the user of the tools.

Figure 9:
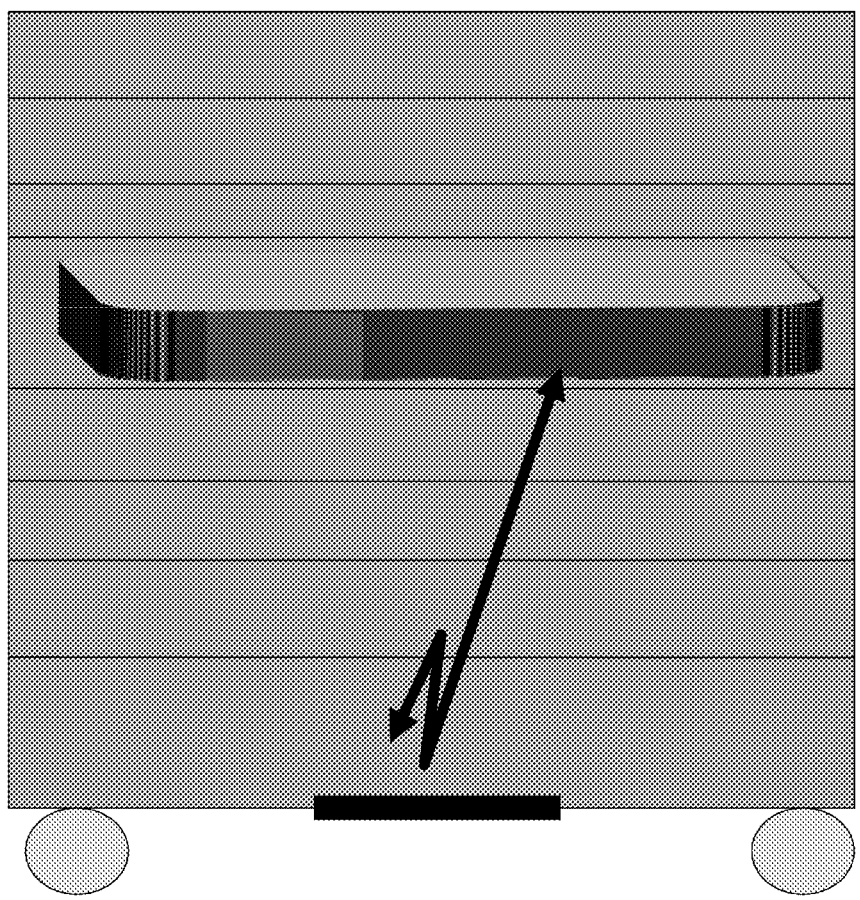
FIG. 9 shows a steel tool cabinet.

In another embodiment, as shown in FIG. 9, the Pads may be placed in a steel cabinet (such as a tool cabinet) in a drawer and a single antenna placed at the base or top can carry out full real-time physical inventory of non-labeled tools placed in a pad, RuBee Tools, and RuBee Smart Tools.

Figure 10:
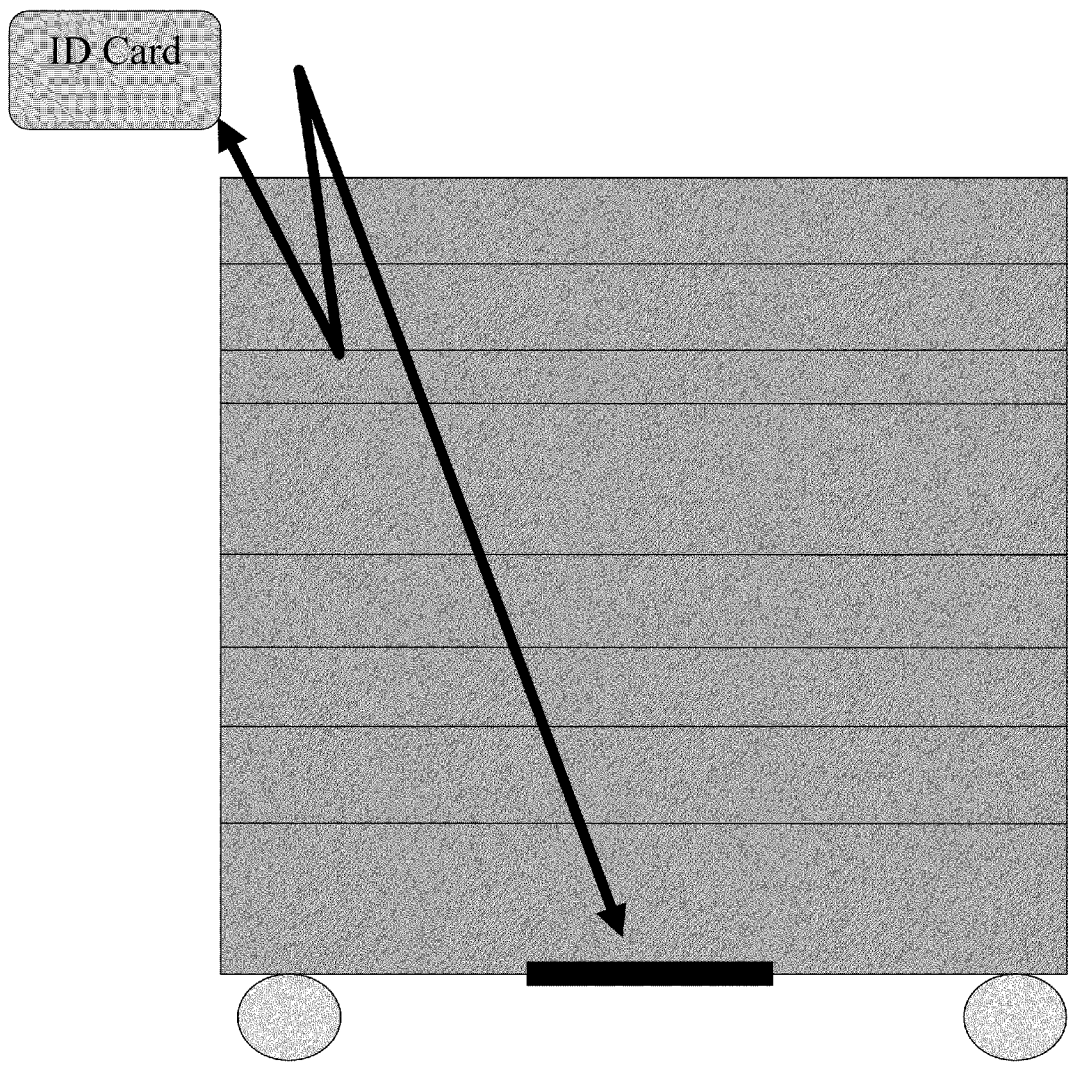
FIG. 10 shows how an ID card may be read by the cabinet of FIG. 9.

Referring to FIG. 10, a RuBee-enabled cart or toolbox can also read an ID card placed in a wallet or around the neck of the user, or attached to a lanyard. When the user walks up to the cart, if he/she is allowed access the lock will automatically open, and date and time can be logged.

Figure 11:
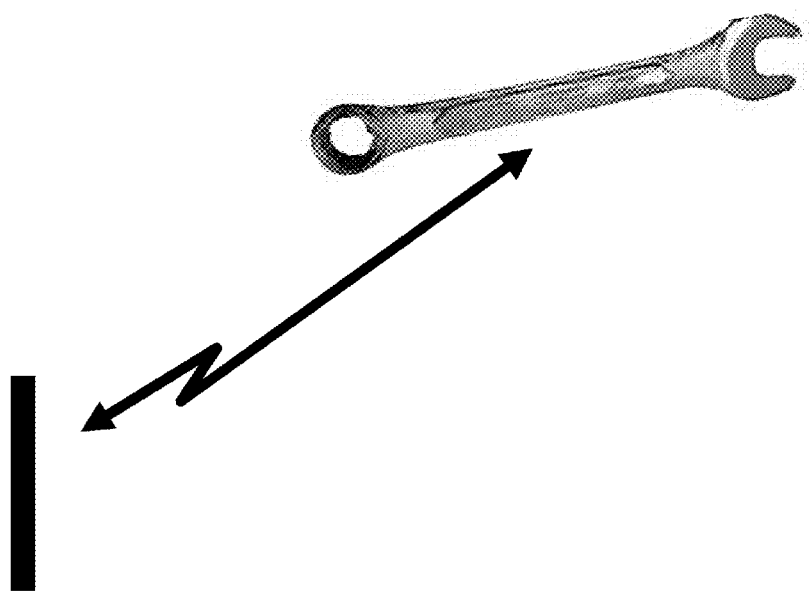
FIG. 11 shows a RuBee enabled tool.

Referring to FIG. 11, RuBee Smart tools have two advantages over all other configurations. They can be "Found when Lost" with a Geiger counter-like device, and full tool authentication is possible without risk of clones or spoofs.

Figure 12:
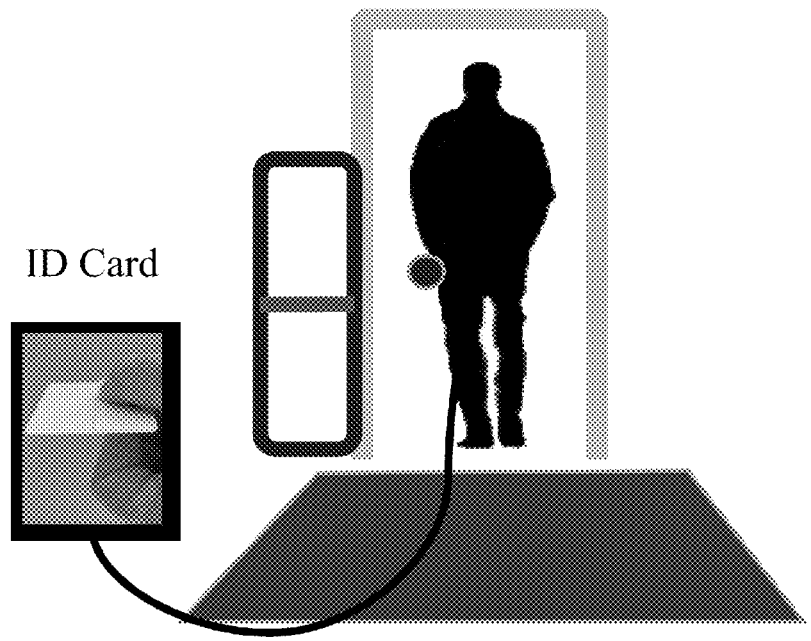
FIG. 12 shows a person working through a portal with an ID card.

In another embodiment highlighting an additional advantage of the system according to an embodiment of the invention, as shown in FIG. 12, tools may be read and associated with their users with conventional RuBee Mats and antennas that might be used in an access control system.

Therefore, it will understood by those skilled in the art that other modifications can be made to the above-described embodiments within the spirit of the invention. The above descriptions of embodiments are not intended to be exhaustive or limiting in scope. The embodiments, as described, were chosen in order to explain the principles of the invention, show its practical application, and enable those with ordinary skill in the art to understand how to make and use the invention. It should be understood that the invention is not limited to the embodiments described above, but rather should be interpreted within the full meaning and scope of this disclosure with the appended drawings.

The invention claimed is:

1. A system for identifying, monitoring, and tracking a plurality of tools, the system comprising:
   a pad for placing the plurality of the tools, wherein the pad comprises
      a plurality of appropriately sized cutouts for nesting each of the tools;
      a sensor in each cutout that detects placement and removal of the tool in the cutout;
      a low frequency radio tag placed in the pad and operatively coupled with each sensor for reading each sensor, said radio tag operating at a low clock frequency and configured to receive and transmit data signals within a peer-to-peer network with any low frequency active radiating transceiver, the radio tag comprising:
         a tag antenna operable at a low radio frequency not exceeding 450 kilohertz, a transceiver operatively connected to the tag antenna, said transceiver configured to transmit and receive data signals at the low radio frequency;
         a data storage device configured to store data comprising identification data for identifying the tools;
         a processor configured to process data received from the transceiver and the data storage device and to transmit data to cause said transceiver to emit an identification signal based upon the identification data stored in said data storage device; and
         a connector for a power source to power the processor and the transceiver.

2. The system of claim 1, wherein the low radio frequency does not exceed 132 kilohertz.

3. The system of claim 1 wherein the identification data comprises an internet protocol address, and the processor is operable for communication with an internet router using said internet protocol address, such that at least a portion of the identification data can be transmitted through the internet router to be viewable through a web browser.

4. The system of claim 1, further comprising the energy source operable for activating the transceiver and the processor.

5. The system of claim 1, further comprising: a reader in operative communication with the tag antenna, said reader configured to receive data signals from the radio tag, wherein said data signals indicate placement and removal of the plurality of the tools.

6. The system of claim 1, wherein the pad is portable and can be placed in a drawer.

7. The system of claim 6, further comprising:
   an antenna placed around an outside area of the pad for increasing a range of the low frequency radio tag; wherein the low frequency radio tag also logs tool placement and removal placement in the data storage and provides local information about status and history.

8. The system of claim 6, wherein the radio tag further comprises at least one sensor operable to generate a status signal upon sensing a pre-determined status condition.

9. The system of claim 8 wherein the transceiver is operable to automatically emit a warning signal at the low radio frequency upon generation of the status signal by the at least one sensor.

10. The system of claim 9, wherein the radio tag further comprises:
   a clock operable to generate a time signal corresponding to the status signal, and
   wherein the data storage device is operable to store corresponding pairs of status and time signals as a temporal history of events corresponding to the tools.

11. The system of claim 10, wherein the transceiver is operable to automatically transmit the temporal history at the low radio frequency upon receipt by said transceiver of a data signal that corresponds to the identification data stored in the data storage device.

12. The system of claim 6 wherein the radio tag further comprises an optional display for presenting status and history without the need for a reader.

13. The system of claim 6 wherein the radio tag further comprises at least one LED button.

14. The system of claim 12 wherein the radio tag further comprises a button for scrolling data presented on the display.

15. The system of claim 6 wherein the radio tag further comprises extra SRAM for data logging.

16. The system of claim 1 wherein the cutouts are shaped according to the tool to be placed in the cutout.

17. The system of claim 5, further comprising:
   at least one field antenna disposed at an orientation and within a distance from the radio tag that permits effective communication therewith at the low radio frequency.

18. The system of claim 17 further comprising wherein the reader, the at least one field antenna, and a transmitter are combined into a handheld device configured for reading and transmitting signals to and from the radio tag.

19. The system of claim 5 further comprising:
   a central data processor in operative communication with the reader.

20. A method for identifying, monitoring and tracking a plurality of tools, said method comprising:
   placing a sensor in each cutout of a pad for housing the plurality of the tools, wherein each tool is nested in an appropriately sized cutout, wherein the sensor detects placement and removal of the tool from the cutout;
   placing a low frequency radio tag in the pad; and
   operatively coupling said low frequency radio tag with each sensor for reading each sensor, said low frequency radio tag configured to receive and send data signals within a peer-to-peer network with any low frequency active radiating transceiver, said low frequency radio tag comprising: a tag antenna operable at a low radio frequency not exceeding 132 kilohertz, a transceiver operatively connected to the tag antenna, said transceiver configured to transmit and receive data signals at the low radio frequency;
   a data storage device configured to store data comprising identification data for identifying the tools;
   a processor configured to process data received from the transceiver and the data storage device and to transmit data to cause said transceiver to emit an identification signal based upon the identification data stored in said data storage device; and
   a connector for a power source to power the processor and the transceiver.

21. The method of claim 20 further comprising:
   placing an antenna around an outside area of the pad for increasing a range of the low frequency radio tag;
   wherein the low frequency radio tag further logs tool placement and removal in the data storage and provides local information about status and history.

22. The method of claim 20 further comprising:
   storing, in the data storage device of the low frequency radio tag, data comprising identification data relating to said tool; and
   reading the identification data from the transceiver of the radio tag by interrogating said radio tag with radio frequency interrogation signals at a low radio frequency not exceeding 450 kilohertz via the tag antenna.

23. The method of claim 22, further comprising a step of:
transmitting the identification data from the radio tag to a central data processor.

24. The method of claim 23 further comprising a step of:
transmitting the data such that the data is viewable via web browser.

25. The method of claim 22 wherein the storing step further comprises
storing a unique identifier corresponding to the tool, the unique identifier stored in the data storage device.

26. The method of claim 25 wherein the unique identifier is used as a key to access data about the tool.

27. The method of claim 24 further comprising a step of transmitting signals to the radio tag to cause the processor to modify its programming, in response to information obtained from the radio tag.

* * * * *